(12) United States Patent
Eilersen

(10) Patent No.: US 8,096,196 B2
(45) Date of Patent: Jan. 17, 2012

(54) LOAD CELL

(75) Inventor: Nils Aage Juul Eilersen, Vedbæk (DK)

(73) Assignee: Siemens AG, München (DE)

( * ) Notice: Subject to any disclaimer, the term of this patent is extended or adjusted under 35 U.S.C. 154(b) by 0 days.

(21) Appl. No.: 12/808,089

(22) PCT Filed: Dec. 12, 2008

(86) PCT No.: PCT/EP2008/067455
§ 371 (c)(1),
(2), (4) Date: Aug. 16, 2010

(87) PCT Pub. No.: WO2009/077463
PCT Pub. Date: Jun. 25, 2009

(65) Prior Publication Data
US 2010/0300215 A1    Dec. 2, 2010

(30) Foreign Application Priority Data
Dec. 14, 2007   (DK) .................................. 2007 01787

(51) Int. Cl.
G01D 7/00    (2006.01)
G01L 1/04    (2006.01)
G01L 1/00    (2006.01)
(52) U.S. Cl. ......... 73/862.623; 73/862.041; 73/862.043; 73/862.626
(58) Field of Classification Search ............. 73/862.626, 73/862.625, 862.621, 862.381
See application file for complete search history.

(56) References Cited

U.S. PATENT DOCUMENTS

| | | | |
|---|---|---|---|
| 4,089,036 A | | 5/1978 | Geronime |
| 4,322,775 A | | 3/1982 | Delatorre |
| 4,691,574 A | | 9/1987 | Delatorre |
| 4,737,706 A | | 4/1988 | Eilersen |
| 5,006,952 A | * | 4/1991 | Thomas ..................... 361/283.2 |
| 5,421,213 A | * | 6/1995 | Okada ....................... 73/862.043 |
| 5,969,270 A | * | 10/1999 | Doemes et al. .......... 73/862.626 |
| 6,257,068 B1 | * | 7/2001 | Briefer et al. .................. 73/718 |
| 6,829,953 B2 | * | 12/2004 | Ishiguro et al. ............. 73/862.52 |
| 2006/0267321 A1 | * | 11/2006 | Harish et al. .................. 280/735 |
| 2007/0227257 A1 | * | 10/2007 | Harish et al. .................... 73/780 |

FOREIGN PATENT DOCUMENTS
WO    WO 00/43745    7/2000
* cited by examiner

Primary Examiner — Lisa Caputo
Assistant Examiner — Jonathan Dunlap
(74) Attorney, Agent, or Firm — Cozen O'Connor

(57) ABSTRACT

A load cell includes a cylindrical ring with one end closed by a membrane configured to receive a load or force to be measured. A sensor carrier plate is arranged in a cavity formed by the ring and the membrane. The sensor carrier plate is coupled to the membrane to undergo a displacement upon deflection of the membrane. The sensor carrier plate has an inner and an outer portion and carries in the outer portion at least one sensor adapted for sensing the displacement and generating a signal based on the load or force applied to the membrane. The sensor carrier plate is movably coupled to the membrane at a location between the inner portion and the outer portion. At least one further sensor is arranged in the inner portion generating a signal changing with opposite sign with respect to the signal of the sensor.

14 Claims, 6 Drawing Sheets

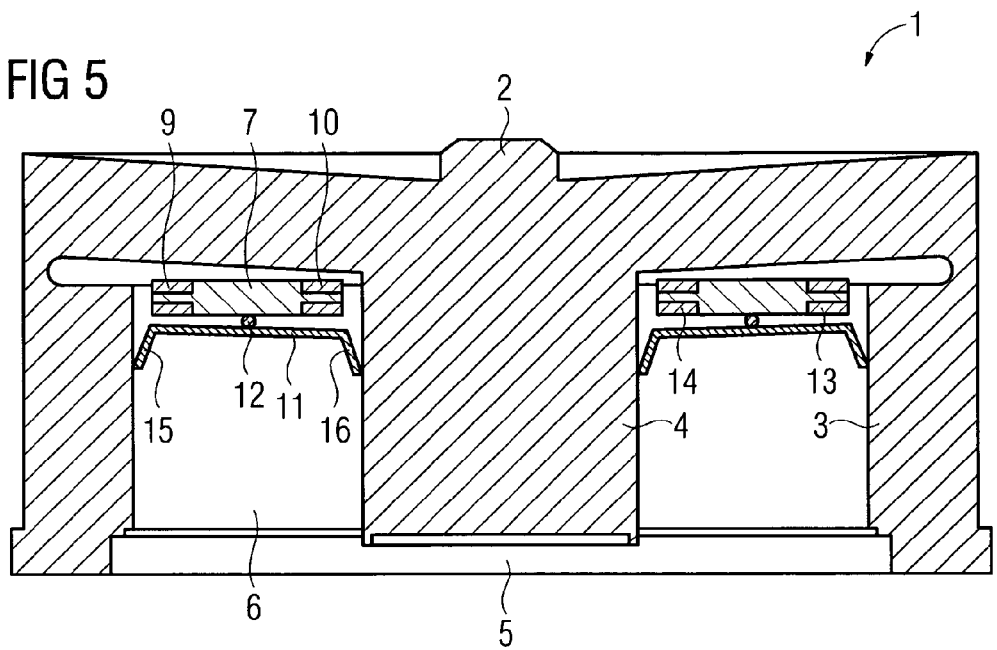
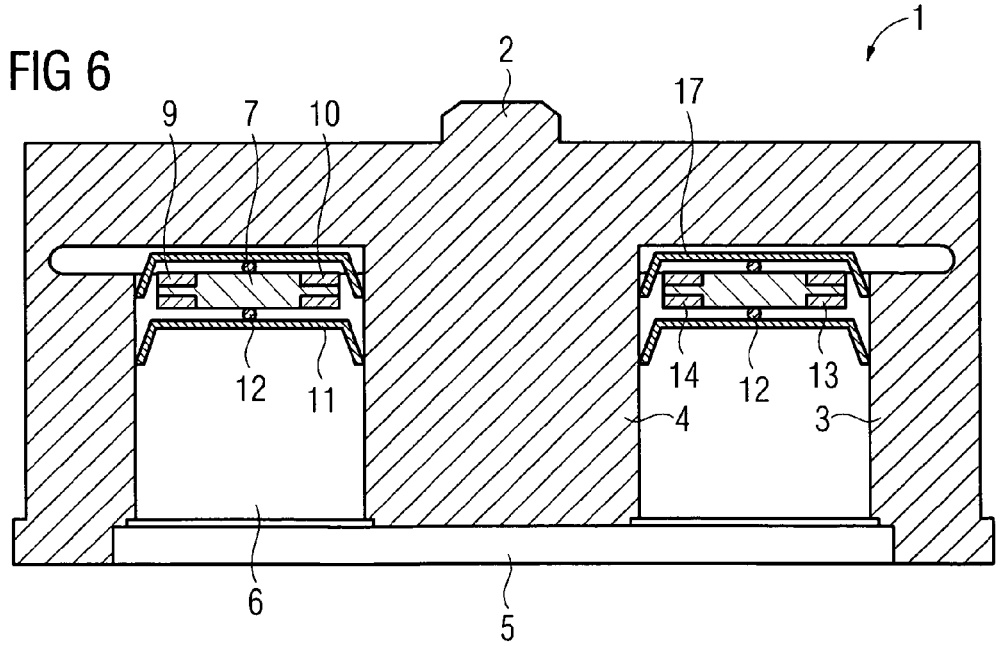

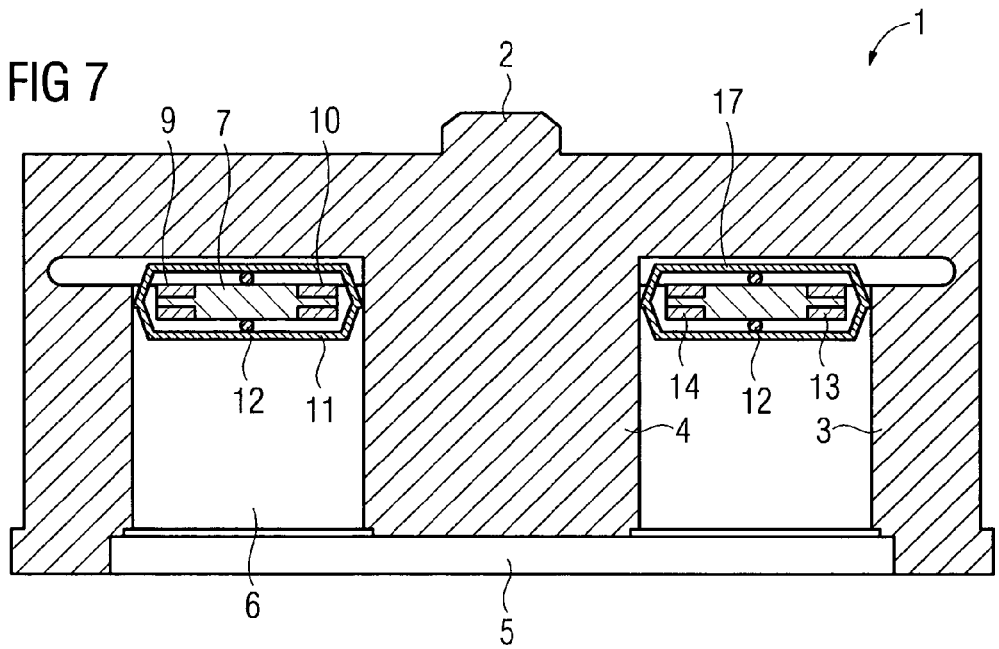
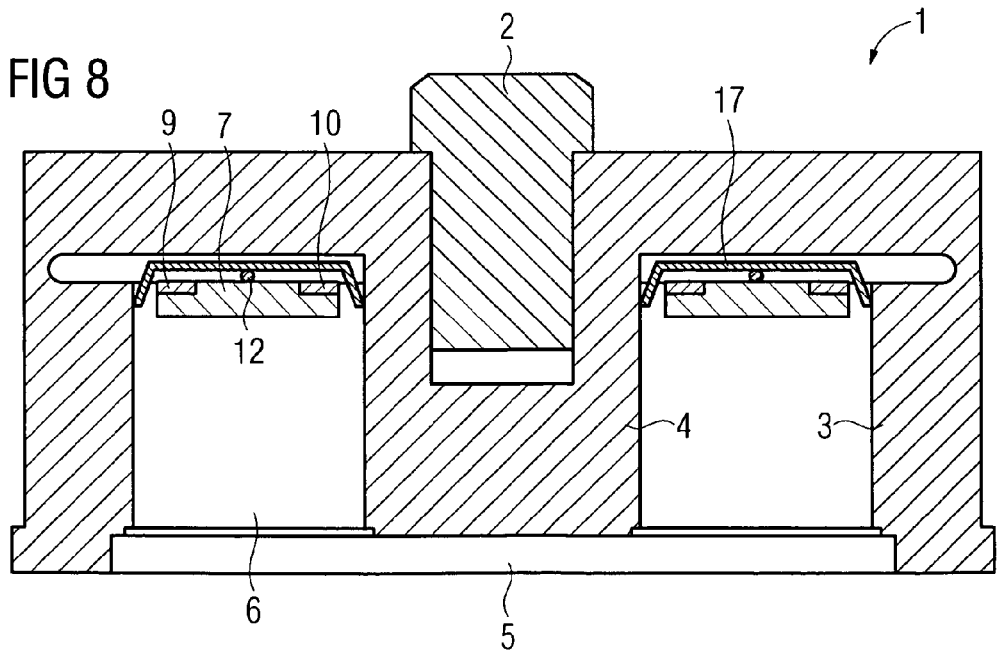

LOAD CELL

PRIORITY CLAIM

This is a U.S. national stage of application No. PCT/EP2008/067455, filed on 12 Dec. 2008. Priority is claimed on Denmark Application No.: 200701787, filed 14 Dec. 2007, the content of both applications are incorporated herein by reference.

BACKGROUND OF THE INVENTION

1. Field of the Invention

The invention relates to a load cell comprising a cylindrical ring which at one end is closed by a membrane for receiving a load or force to be measured, and further comprising a sensor carrier plate arranged in a cavity formed by the ring and the membrane, the sensor carrier plate being coupled to the membrane to undergo a displacement upon deflection of the membrane and said sensor carrier plate having an inner and an outer portion and carrying in the outer portion at least one sensor adapted for sensing the displacement and generating a signal due to the load or force applied to the membrane.

2. Description of the Prior Art

A load cell is known from U.S. Pat. No. 4,089,036. If the known load cell is heated or cooled with a fast rate or with a temperature gradient across the load cell body a temporary shift of its measuring characteristic is experienced.

SUMMARY OF THE INVENTION

An object of the invention is to provide a load cell of the aforementioned precision type, fitted with a sensor that automatically compensates fast changing temperatures and temperature gradients.

According to the invention this object is achieved by a load cell of the above-mentioned type, in which the sensor carrier plate is movably coupled to the membrane at locations between the inner portion and the outer portion and that at least one further sensor is arranged in the inner portion, the sensor generating a signal changing with opposite sign with respect to the signal of the sensor.

As the signal of the at least one sensor and at least one further sensor change with opposite signs, the sensors constitute a differential sensor means which allows load or force to be measured with high precision even in environments where the temperature changes fast and where the load cell experiences a high temperature gradient. The use of more than one sensor and one further sensor gives the possibility to average temperature effects.

In a preferred embodiment of the load cell according to the invention, a second membrane is arranged in the cavity, the second membrane being coupled at its periphery to the ring or to the periphery of the membrane and further coupled in its center portion to a center portion of the load receiving membrane, the sensor carrier plate is arranged between the load receiving membrane and the second membrane and is supported by the second membrane. The advantage obtained by this embodiment is the possibility to create signals of opposite signs whereby a high sensitivity to the measured load or force and a high degree of automatic compensation to fast temperature changes or high temperature gradients is obtained.

The second membrane may be directly suspended on the center of the main membrane. The advantage obtained by this embodiment of the invention is the possibility to create signals of opposite signs whereby a high sensitivity to the measured load or force and a high degree of automatic compensation to fast temperature changes or high temperature gradients is obtained. A further advantage is the decreased sensitivity to off center forces.

The sensor and the further sensor may be adapted to sense the distance to the load receiving membrane. Preferably, the sensor carrier plate carries additionally at least one outer second sensor and inner second further sensor adapted to sense the distance to the second membrane.

In another preferred embodiment of the load cell according to the invention, a third membrane is arranged in the cavity, the third membrane being coupled at its periphery to the ring or to the periphery of the membrane and further coupled in its center portion to a center portion of the membrane, and that the sensor carrier plate is arranged below and suspended on the third membrane. In this embodiment, the sensor and the further sensor are adapted to sense the distance to the third membrane. The advantage obtained by this embodiment of the invention is the possibility to create signals of opposite signs whereby a high sensitivity to the measured load or force and a high degree of automatic compensation to fast temperature changes or high temperature gradients is obtained. A further advantage by this embodiment of the invention lies in that a shock load does not introduce tension forces in the support between the sensor carrier plate and the second membrane.

Preferably, the sensor carrier plate is arranged and held between the second membrane and the third membrane. The advantage obtained by this embodiment is the possibility to create signals of opposite signs whereby a high sensitivity to the measured load or force and a high degree of automatic compensation to fast temperature changes or high temperature gradients is obtained. A further advantage by this embodiment lies in that eccentric load forces or side loads are compensated to a high degree.

The second membrane and the third membrane may be arranged to form a housing containing the sensor carrier plate, with both, the second and third membranes coupled to the main membrane by the same means. The advantage obtained by this embodiment of the invention is the possibility to create signals of opposite signs whereby a high sensitivity to the measured load or force and a high degree of automatic compensation to fast temperature changes or high temperature gradients is obtained. Another advantage by this embodiment according to the invention lies in that eccentric load forces or side loads are compensated to a high degree. A further advantage of this embodiment is the possibility to preassemble and adjust the sensor unit comprised of the sensor carrier plate and the second and third membranes before mounting it in the load cell body.

According to another embodiment of the invention, the sensor carrier plate is suspended directly on the load receiving membrane. The advantage obtained by this embodiment of the invention is a simple design.

In a preferred embodiment of the load cell according to the invention, the above-mentioned sensors are of capacitive type. The advantage obtained by capacitive sensors is the very high sensitivity to the forces and loads applied to the load cell and the non-contacting measuring principle, which gives a high tolerance to shocks and overloads as only the elastic body is overloaded and not the sensor system.

Alternatively, the sensor may be an inductive sensor. The advantage obtained by an inductive sensors is the possibility of functioning in extreme environments and the non-contacting measuring principle which gives a high tolerance to shocks and overloads as only the elastic body is overloaded and not the sensor system.

BRIEF DESCRIPTION OF THE DRAWINGS

For further description of the invention, reference is made to the accompanying drawings, in which, by way of example:

FIG. 5 is a sectional view of the load cell of FIG. 2 when the membrane is deflected as a result of an applied load;

FIG. 6 is a sectional view of a second embodiment of the load cell according to the invention with the sensor carrier plate arranged and hold between the second membrane and a third membrane;

FIG. 7 is a sectional view of an embodiment including a modification of the load cell shown in FIG. 6 where the second membrane and the third membrane are arranged to form a housing containing the sensor carrier plate;

FIG. 8 is a sectional view of a third embodiment of the load cell according to the invention with the sensor carrier plate suspended on the third membrane;

DETAILED DESCRIPTION OF THE PREFERRED EMBODIMENTS

Figure 1:
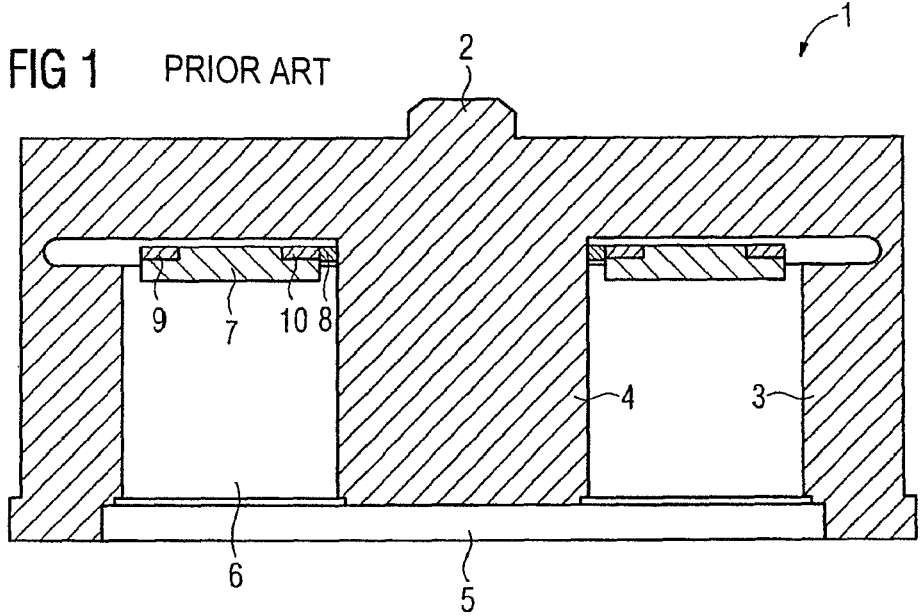
FIG. 1 is a sectional view of a load cell of prior art type.

FIG. 1 shows a prior art load cell or a modification thereof which does not fall within the scope of the invention. An elastic body, which is normally fabricated in high strength stainless steel, includes a membrane 1 with a load button 2 for receiving the load or force to be measured and an outer cylindrical ring 3. A bottom membrane 5 closes a cavity 6 formed by the membrane 1 and the cylindrical ring 3. The membrane 1 comprises a cylindrical center part 4 protruding into the cavity 6. In the cavity 6 is arranged a sensor carrier plate 7 which is fastened to the cylindrical center part 4 by a support 8. On the upper surface of the sensor carrier plate 7, which is made of insulating material, are mounted a sensor in the form of an outer circular electrode and a further sensor 10 in form of an inner circular electrode. The electrodes 9 and 10 constitute with the lower surface of the membrane 1 two measuring capacitances which change because of changing distance between the electrode 9 and the membrane 1 and between the electrode 10 and the membrane 1, when the membrane 1 deflects as a result of a load applied to the load button 2.

It is readily seen that the change of distance is higher for the outer electrode 9 than for the inner electrode 10 when the membrane 1 deflects. Therefore, the electrode 9 may be used as the measuring electrode with a high signal whereas the inner electrode 10 may function as a reference electrode which can compensate for a shift of position of the sensor carrier plate 7 relative to the membrane 1 if the signal of electrode 10 is subtracted from the signal of electrode 9.

If the sensor carrier plate 7 is mounted to the inner side of the cylindrical ring 3, then the electrode 10 would be used as the measuring electrode and the electrode 9 would function as the reference electrode.

A problem with the load cell shown in FIG. 1 is that the sign of the signal change from the measuring electrode 9 and the sign of the signal change from the reference electrode 10 are the same and, as the reference signal is subtracted from the measuring signal, the useable signal is decreased. The decrease of the useable signal may be counteracted by a higher deflection of the membrane when loaded by the load or force to be measured, but a higher deflection results in a higher strain in the elastic material of the load cell and a higher nonlinearity.

The problem of the same sign of the signal of the electrodes 9 and 10 is the reason why reference electrodes are not used in the load cell known from U.S. Pat. No. 4,089,036.

Figure 2:
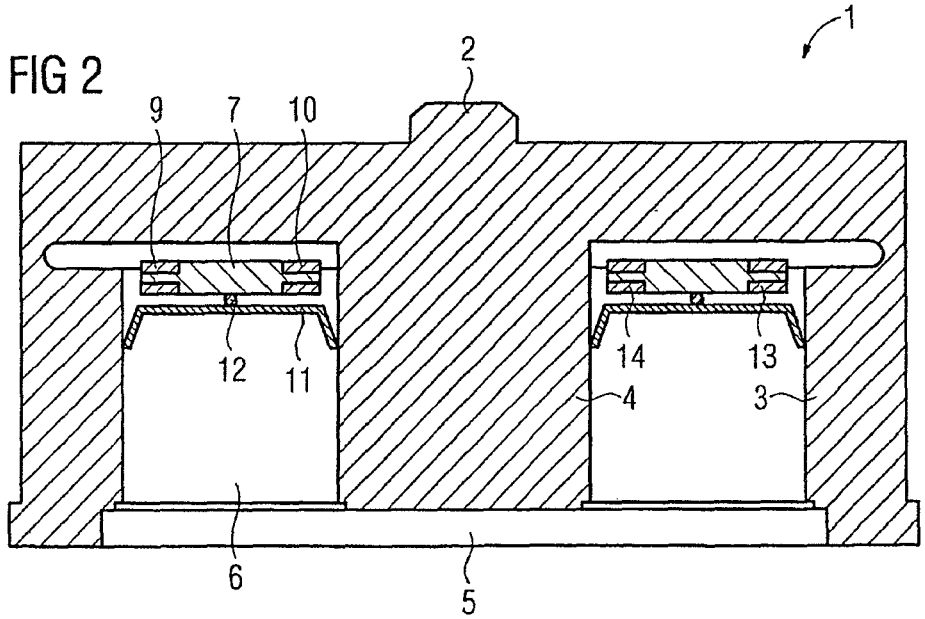
FIG. 2 is a sectional view of a first embodiment of the load cell according to the invention having a membrane for receiving the load or force to be measured, a sensor carrier plate with sensor and a second membrane supporting the sensor carrier plate.

FIG. 2 shows a first embodiment of the load cell according to the present invention where the elastic body, which is normally fabricated in high strength stainless steel, includes the membrane 1 with the load button 2 for receiving the load or force to be measured, the cylindrical ring 3 and the cylindrical center part 4. The bottom membrane 5 closes the cavity 6 formed by the membrane 1 and the outer cylindrical ring 3 and cylindrical center part 4.

In the cavity 6, the sensor carrier plate 7 is movably coupled to a second membrane 11 by a number of supports 12 in a region between the outer electrode 9 and the inner electrode 10. The second membrane 11 is fastened to the inner surface of the ring 3 and to the surface of the center cylindrical part 4. On the upper surface of the sensor carrier plate 7 are mounted the outer circular electrode 9 and the inner circular electrode 10. On the lower surface of the sensor carrier plate 7 are mounted a second sensor in the form of a second outer circular electrode 13 and a second further sensor 14 in form of a second inner circular electrode 14.

The electrodes 9 and 10 constitute with the lower surface of the membrane 1 two measuring capacitances which change because of changing distance between the electrodes 9, 10 and the membrane 1 when the membrane 1 is deflected as a result of a load applied to the load button 2. Likewise, the electrodes 13 and 14 constitute with the upper surface of the second membrane 11 two measuring capacitances which change because of changing distance between the electrodes 13, 14 and the membrane 11, when the second membrane 11 is deflected as a result of a load applied to the load button 2.

Figure 3:
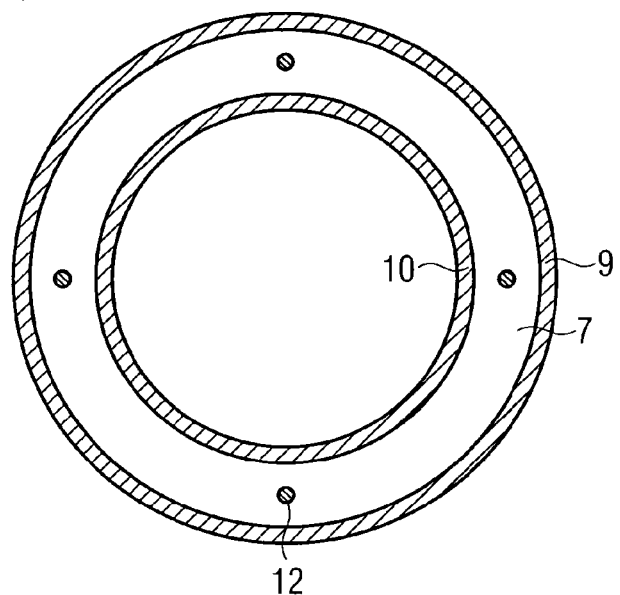
FIG. 3 is a plan view of an example of the sensor carrier plate of the embodiment of FIG. 2.

FIG. 3 shows a top view of the sensor carrier plate 7 carrying the circular capacitance electrodes 9 and 10. The electrodes 9 and 10 may be thick film electrodes applied to a ceramic sensor carrier plate 7 by screen printing. The correspondent set of further electrodes 13, 14 is applied to the other side of the sensor carrier plate 7. The areas of the outer electrodes 9, 13 and inner electrodes 10, 14 and the positions of the electrodes 9, 10, 13, 14 are chosen to provide the best possible combination of linearity and temperature compensation for the load cells according to the invention. The supports 12 are also positioned to provide the best possible combination of linearity and temperature compensation.

The sensor carrier plate 7 is not necessarily produced of insulating material, but may be produced of any suitable dimensionally stable material applied with insulated layers or insulated parts to support the capacitive electrodes.

The electrodes 9 and 10 may also be conductive rings bonded to an insulating sensor carrier plate 7. Alternatively the electrodes 9 and 10 may be produced by printed circuit technology for low cost products.

Figure 4:
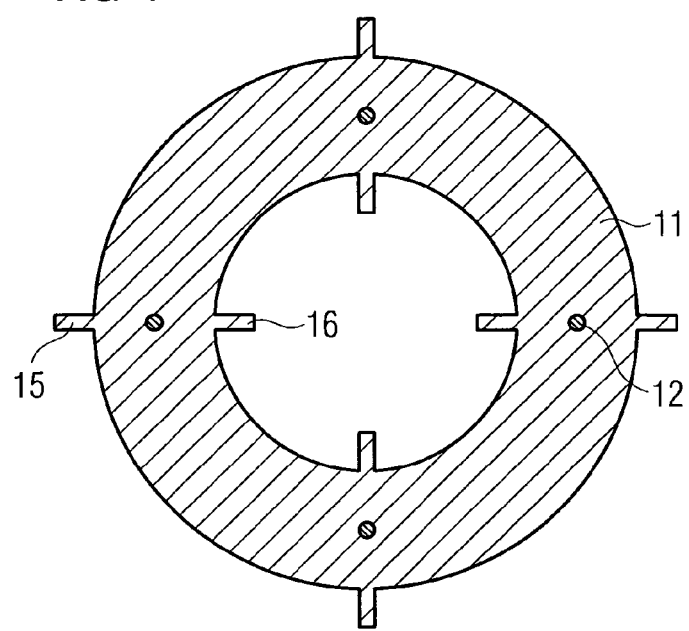
FIG. 4 is a plan view of an example of the second membrane of the embodiment of FIG. 2.

FIG. 4 shows a top view of the second membrane 11 with the supports 12, outer mounting lugs 15 and inner mounting lugs 16. The second membrane 11 may be mounted to the ring 3 and the center cylindrical part 4 by laser or spot welding.

FIG. 5 shows the load cell of FIG. 2 where the membrane 1 and the second membrane 11 are deflected as a result of a load applied to the load button 2. As the second membrane 11 is coupled to the membrane 1 or ring 3 by means of the outer mounting lugs 15 and to the central part 4 of membrane 1 by means of the inner mounting lugs 16, it is readily seen that the deflection of the two membranes 1 and 11 is essentially the same. By designing the stiffness of the flat portion of the membrane 11 relative to the stiffness of the mounting lugs 15 and 16, a linearity and a hysteresis compensation may be obtained. The stiffness of the second membrane 11 may be tailored by the introduction of cut outs and by slitting the surface at different positions with some of the slits advantageously going to the edges of the flat surface. The supports 12 are designed to allow an angular shift between the surface of the second membrane 11 and the surface of the sensor carrier plate 7, while at the same time keeping the distance between these two members constant at the positions of the supports 12. It is readily seen that the sensor carrier plate 7 does not undergo a deformation, but moves an amount proportional to the deflection of the second membrane 11, where the factor between the movement of the sensor carrier plate 7 and the deflection of the second membrane 11 is geometrically dependent of the position of the supports 12 on the second membrane 11 relative to the distances to the mounting lugs 15 and 16.

It is also readily seen that, through the deflection of the membrane 1, the distance between the membrane 1 and the outer electrode 9 is increasing while the distance between the membrane 1 and the inner electrode 10 is decreased. Likewise, through the deflection of the second membrane 11, the distance between the membrane 11 and the outer electrode 13 is decreased while the distance between the second membrane 11 and the inner electrode 14 is increased.

The load cell shown in FIGS. 2 to 5 has the very important advantage that a true differential measurement is obtained. A true differential measurement has the advantage of better linearity and better zero point stability than could be obtained by prior art.

The dimension of the supports 12, perpendicular to the surface of the sensor carrier plate 7, which is the only parameter governing the mean distance between the second membrane 11 and the electrodes 13 and 14, may be kept very small, and therefore a change of temperature will only have a minor influence on the distances and thus the measurement performed by the differential sensor means consisting of the electrodes 13, 14 and the second membrane 11 will be very stable.

The other differential sensor means consisting of the electrodes 9, 10 and the membrane 1 does not exhibit the same stability because the distances are governed by the thermal expansion of the height of the sensor carrier plate 7, the thermal expansion of the mounting lugs 15 and 16 and the thermal expansion of the outer cylindrical and the center cylindrical parts.

The load cell shown in FIG. 6 does not use the membrane 1 as a measuring membrane, but only as a load carrying membrane which is tailored to the load capacity of the load cell. The measurement is performed by two differential sensor means, one consisting of the electrodes 9, 10 and a third membrane 17 and the other consisting of the electrodes 13, 14 and the second membrane 11. Both differential sensor means share in this embodiment the same sensor carrier plate 7, and both exhibit a very high stability due to the differential measurement in combination with the stable supports 12. A further advantage obtained by the load cell shown in FIG. 6 lies in the fact that a tilting of the load receiving membrane 1 by eccentric or side forces applied to the load cell through the load button 2, is only partially transferred to the second and third membranes 11, 17 and that the small amount of tilting transferred to the second and third membranes 11, 17 is compensated by said membranes 11, 17 acting differentially.

In the load cell shown in FIG. 7 the sensor carrier plate 7 is mounted by the supports 12 between the second membrane 11 and the third membrane 17. This embodiment exhibits the same stability as the load cell according to FIG. 6, but has the added advantage that the membranes 11 and 17 form a housing containing the sensor carrier plate 7. The thus obtained unit may be preassembled and tested before being mounted in the load cell cavity 6.

A further advantage of the load cell according to FIG. 7 lies in the fact that a tilting of the main membrane 1 by eccentric or side forces applied to the load cell through the load button 2, is only partially transferred to the second and third membranes 11, 17 and that the small amount of tilting transferred to the membranes 11, 17 is compensated by the membranes 11, 17 acting differentially.

In FIG. 8 an embodiment of the load cell according to the invention is shown with the sensor carrier plate 7 mounted or suspended on the lower side of the third membrane 17 which coupled to the main membrane 1. The second membrane has been omitted. The advantage by this embodiment is low cost and the ability to withstand very high shock loads as the supports 12 only undergoes compression forces during the overload. The load button 2 is here shown as a removable member which is mounted in a recess in the center circular part 4 of the membrane 1. The advantage lies in the possibility to adapt the load button 2 to the actual application and also in the possibility that the load button 2 may designed to transfer the load to be measured to the bottom of the recess and from there to the main membrane 1 and not directly to the surface of the main membrane 1. Hereby stresses are not introduced to the surface of the main membrane 1.

Figure 9:
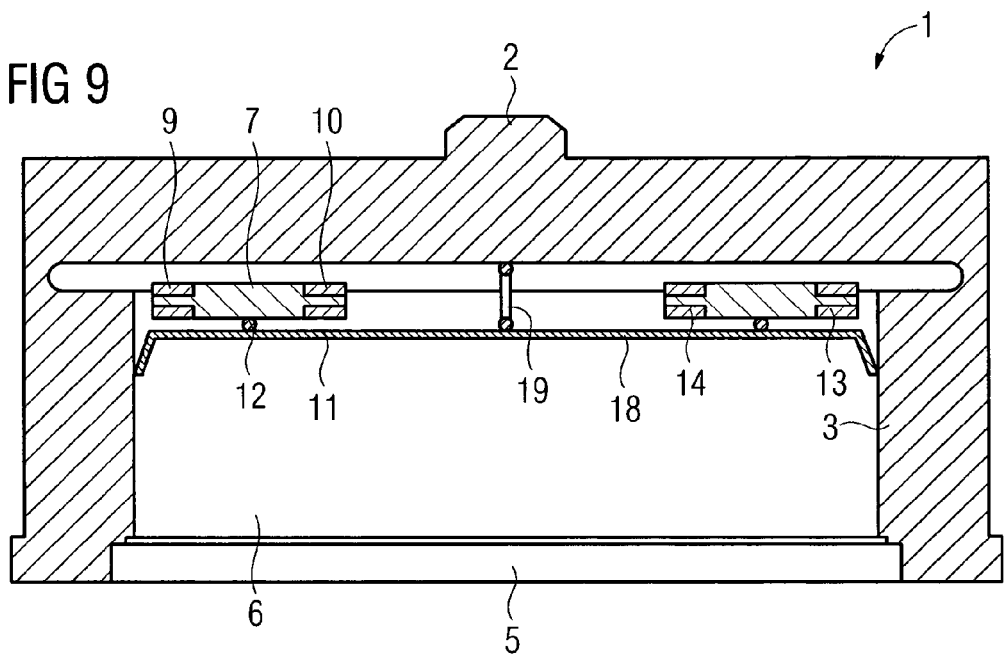
FIG. 9 is a sectional view of a fourth embodiment of the load cell according to the invention with the second membrane suspended on the load receiving membrane.

The load cell shown in FIG. 9 has basically the same characteristics as the load cell according to FIG. 2, but has the added advantage that the tilting of the load receiving membrane 1, when off center loads and side loads are applied to the load button 2, will not be transferred to the second membrane 18 because the coupling between the membranes 1 and 18 is performed by a member 19 which is stiff lengthwise but allows angular movements at both ends. The tilting of the membrane 1 will however be measured by the electrodes 9 and 10 and will give an error. This error may be avoided if a third membrane is introduced above the sensor carrier plate 7, basically as shown in FIG. 6 or 7.

Figure 10:
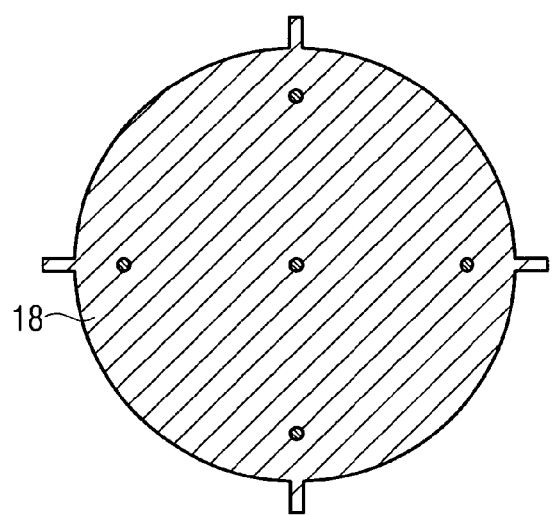
FIG. 10 is a plan view of an example of the second membrane of the embodiment of FIG. 9.

FIG. 10 shows a top view of the second membrane 18 which, unlike the annular disks 11 and 17, is a solid disk.

Figure 11:
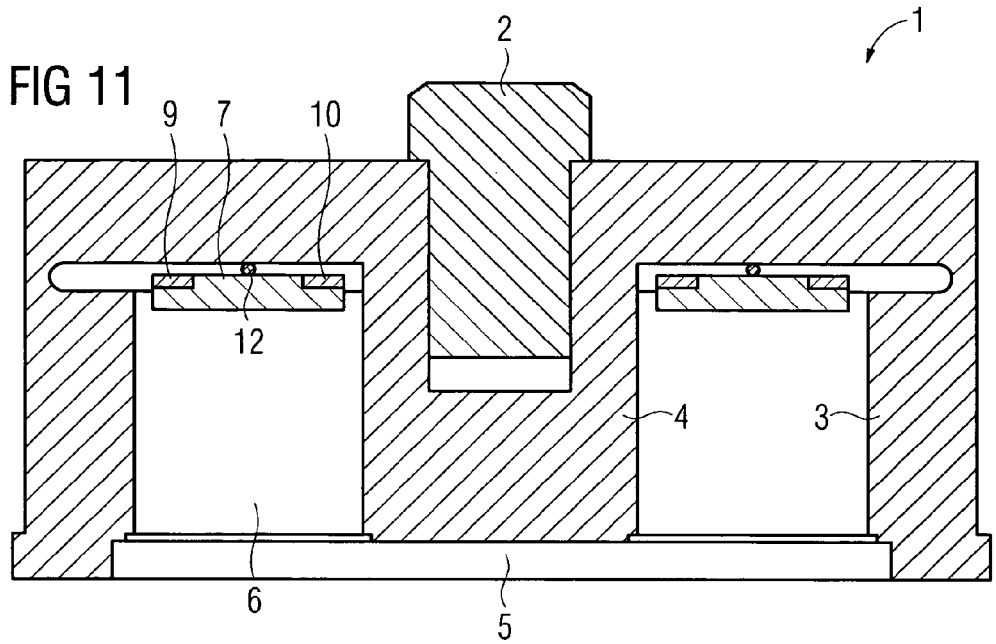
FIG. 11 is a sectional view of a fifth embodiment of the load cell according to the invention with the sensor carrier plate suspended on the load receiving membrane.

FIG. 11 shows a load cell with the sensor carrier plate 7 suspended directly on the load receiving membrane 1 through the supports 12. The advantage lies in the very simple construction. However, tilting of the main membrane 1 due to eccentric forces or side loads is not compensated and shock loads are transmitted directly to the sensor carrier plate 7 and are not damped by being transferred through a second membrane.

The capacitor electrodes 9, 10, 13, 14 in all embodiments may be connected to a capacitance measuring circuit mounted in the cavity 6 and a cable may be brought out to the instrumentation through the wall of the outer cylindrical part. This circuit could, for example, be according to U.S. Pat. No. 4,737,706.

Instead of the capacitor electrodes, inductive sensors in the form of small coils may be placed preferably at the same positions on the sensor carrier plate 7 as shown for the capacitor electrodes 9, 10, 13, 14.

Due to the fact that preferred embodiments of the invention has been illustrated and described herein it will be apparent to those skilled in the art that modifications and improvements may be made to forms herein specifically disclosed. For example, in the region where periphery of the load receiving membrane 1 is attached to or merges with the ring 4, a weakening groove in the outer ring 4 may be provided which may have any depth or may be placed at any height in order to tailor the deflection of the membrane 1 to the load cell measuring capacity.

Figure 12:
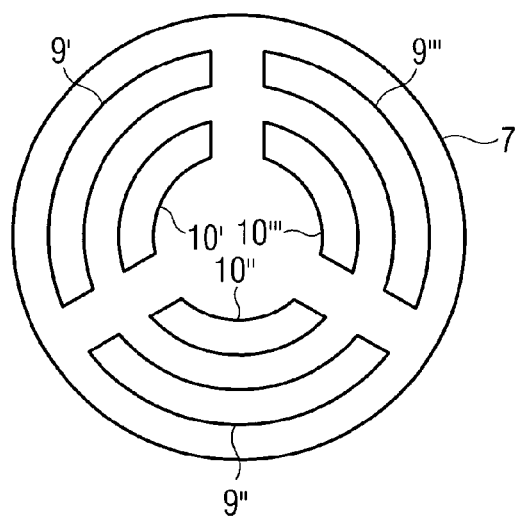
FIG. 12 is a plan view of an example of the sensor carrier plate.

FIG. 12 shows an example of the sensor carrier plate 7 where an outer electrode ring and inner electrode ring are divided into two or more, here three, segments of separate electrodes 9', 9'', 9''' and 10', 10'', 10'''. Each segment may be measured separately by the measuring electronics. The advantage in this embodiment lies in the possibility of tailoring the characteristics of the electrode areas separately.

The invention claimed is:

1. A load cell, comprising:
   a cylindrical ring having a first end and a second end;
   a membrane closing one of said first and second ends of said cylindrical ring and arranged to receive a load or force to be measured, said cylindrical ring and said membrane defining a cavity;
   a sensor carrier plate arranged in said cavity and coupled to said membrane so that said sensor carrier plate undergoes a displacement upon a deflection of said membrane in response to the load or force to be measured, said sensor carrier plate having an inner portion and an outer portion, said sensor carrier plate being movably coupled to said membrane at a location disposed between said inner portion and said outer portion;
   at least one outer sensor arranged on said sensor carrier plate in the outer portion sensing the displacement and generating a signal based on the load or force applied to said membrane; and
   at least one inner sensor arranged on said sensor carrier plate in the inner portion sensing the displacement and generating a signal based changing oppositely with respect to said signal generated by said at least one outer sensor.

2. The load cell of claim 1, further comprising a second membrane arranged in said cavity, a periphery of said second membrane being coupled to the cylindrical ring or to a periphery of said membrane and a center portion of said second membrane being coupled to a center portion of the membrane, the sensor carrier plate being arranged between said membrane and said second membrane and being supported by said second membrane.

3. The load cell of claim 2, further comprising a third membrane arranged in said cavity, a periphery of said third membrane being coupled to said cylindrical ring or to a periphery of said membrane and a center portion of said third membrane being coupled to a center portion of said membrane, and said sensor carrier plate being arranged below and suspended on said third membrane.

4. The load cell of claim 3, wherein the sensor carrier plate is arranged and held between said second membrane and said third membrane.

5. The load cell of claim 3, wherein said second membrane and said third membrane are arranged to form a housing containing said sensor carrier plate.

6. The load cell of claim 3, wherein said at least one inner sensor and said at least one outer sensor are adapted to sense a distance to said third membrane.

7. The load cell of claim 3, wherein the membrane comprises a cylindrical center part protruding into said cavity, said sensor carrier plate and said second and third membranes being configured as annular disks.

8. The load cell of claim 2, wherein the sensor carrier plate carries at least one second outer sensor and at least one second inner sensor adapted to sense the distance to the second membrane.

9. The load cell of claim 1, wherein said sensor carrier plate is suspended on said membrane.

10. The load cell of claim 1, wherein said at least one outer sensor and said at least one inner sensor are each adapted to sense a distance to said membrane.

11. The load cell of claim 1, wherein the membrane comprises a cylindrical center part protruding into said cavity and said sensor carrier plate is configured as an annular disk.

12. The load cell of claim 1, wherein said at least one inner sensor and said at least one outer sensor are capacitive sensors.

13. The load cell of claim 1, wherein said at least one inner sensor and said at least one outer sensor are inductive sensors.

14. The load cell of claim 1, further comprising a second membrane arranged in said cavity, a periphery of said second membrane being coupled to said cylindrical ring or to a periphery of said membrane and a center portion of said second membrane being coupled to a center portion of said membrane, and said sensor carrier plate being arranged below and suspended on said second membrane.

* * * * *